United States Patent
Ireland et al.

(10) Patent No.: US 7,757,939 B2
(45) Date of Patent: Jul. 20, 2010

(54) DEPOSITING ITEMS OF VALUE

(75) Inventors: Philip Michael William Ireland, Hampshire (GB); Alexander Charles Harold James, Hampshire (GB); Karen Joan Cunningham, Buckinghamshire (GB); Pietro Armanini, Mattarello (IT); Simon George Calverley, Hampshire (GB)

(73) Assignee: Talaris Holdings Limited, London (GB)

( * ) Notice: Subject to any disclaimer, the term of this patent is extended or adjusted under 35 U.S.C. 154(b) by 599 days.

(21) Appl. No.: 11/822,394

(22) Filed: Jul. 5, 2007

(65) Prior Publication Data
US 2009/0121010 A1 May 14, 2009

Related U.S. Application Data

(62) Division of application No. 10/495,976, filed as application No. PCT/GB02/05254 on Nov. 22, 2002, now Pat. No. 7,347,358.

(51) Int. Cl.
G06Q 40/00 (2006.01)
G07D 11/00 (2006.01)
G07F 19/00 (2006.01)
G06K 5/00 (2006.01)

(52) U.S. Cl. .................... 235/379; 235/380; 705/43
(58) Field of Classification Search .............. 235/379, 235/380; 705/43; 902/8, 9, 17; 232/7; 109/24.1; 194/215, 218
See application file for complete search history.

(56) References Cited

U.S. PATENT DOCUMENTS

| 4,602,149 A | 7/1986 | Tateisi et al. |
| 5,992,891 A | 11/1999 | Dyball |
| 6,215,397 B1 | 4/2001 | Lindskog |

FOREIGN PATENT DOCUMENTS

| EP | 0 962 895 A2 | 12/1999 |
| EP | 1 031 949 A1 | 8/2000 |
| EP | 1 111 553 A2 | 6/2001 |
| GB | 2 369 914 A | 6/2002 |

OTHER PUBLICATIONS

"Container with Magnetic Stripe for Depositing Cash or Valuables in a Personal Banking Machine"; XP000073835; IBM Technical Disclosure Bulletin; IBM Corp.; vol. 32, No. 6B; Nov. 1989; pp. 328-329.

*Primary Examiner*—Daniel Walsh
(74) *Attorney, Agent, or Firm*—Oliff & Berridge, PLC

(57) ABSTRACT

A method of depositing items of value, the method comprising
1) receiving a temper evident and coded container holding the items of value, the code relating to the content of the container;
2) verifying that the package has been received in an acceptable manner, and, if it has,
3) either incrementing an account with the value of the items of value in the container by reference to the code and without opening the container, or, if the account has previously been incremented, leaving the account unchanged.

11 Claims, 20 Drawing Sheets

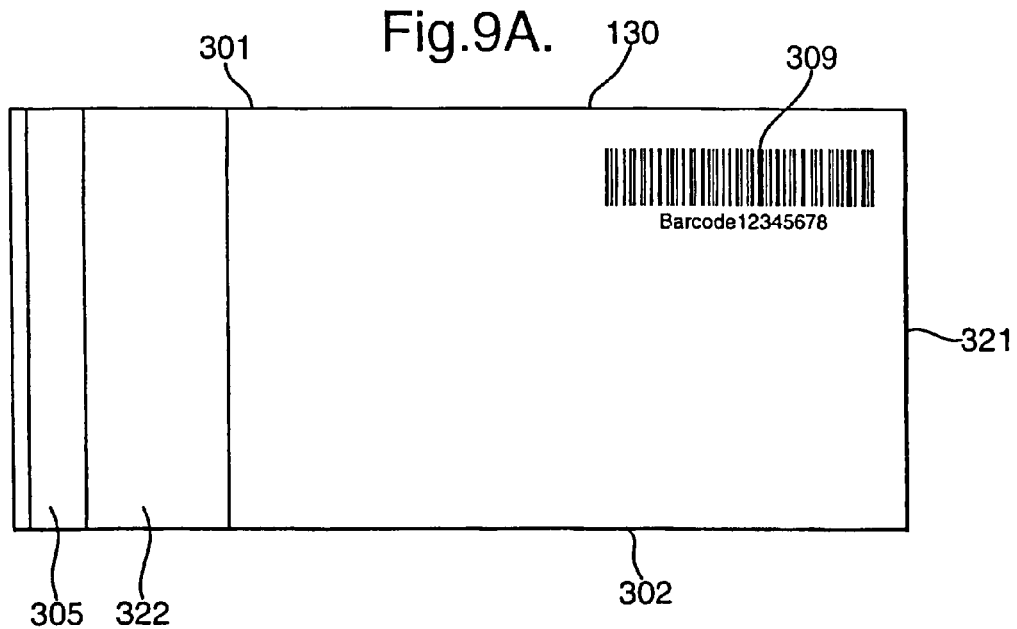
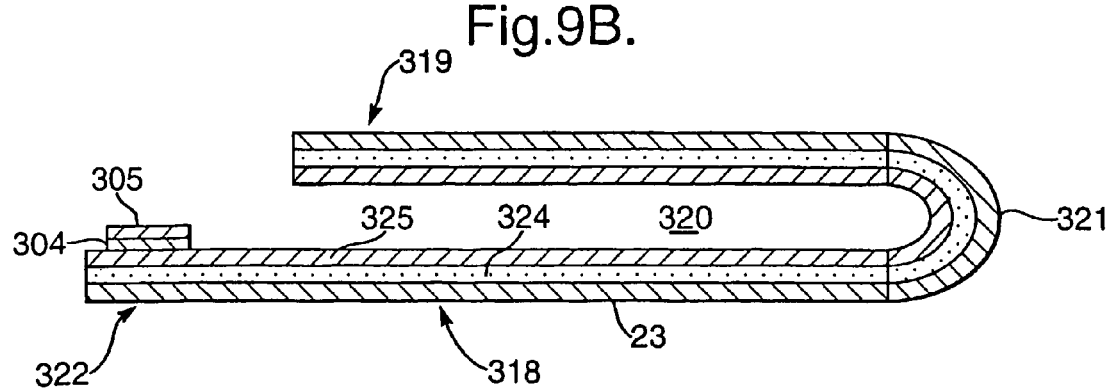

DEFINITIONS:
Envelope = Any package or container for the documents, including cassettes.
Documents = Bank notes, cheques, vouchers.

```
┌─────────────────────┐
│  Preferred options  │
└─────────────────────┘
┌─────────────────────────┐
┆ Non-preferred options   ┆
└─────────────────────────┘
```

LOCATIONS FOR THE ENVELOPE FILLER EQUIPMENT

- Small shop with one or two tills.
- Bank branch lobby
- Medium sized store with a number of tills.
- Large store with lines of tills, possibly on different floors.
- Department stores with one or two tills in each of several departments or franchises.
- Sports arenas.
- Shopping mall, airport concourse. Several small shops located together.
- Leisure centres.
- Cinemas, theatres.
- Bars, restaurants.
- Gaming, vending machine operators
- Markets.

Fig. 11

DEPOSITING ITEMS OF VALUE

This is a Division of application Ser. No. 10/495,976 filed Oct. 8, 2004, which in turn is a National Stage of PCT/GB02/05254, filed Nov. 22, 2002. The disclosures of the prior applications are hereby incorporated by reference herein in their entirety.

The invention relates to methods of depositing items of value such as cash, including banknotes and coins, and to apparatus for use in such methods.

Conventionally, documents of value such as banknotes can be deposited relatively automatically within a bank or other financial institution by feeding the banknotes into a banknote reader/verifier. This process may be self service or carried out with the assistance of a teller. This system, if it accepts the banknotes, will then pass those notes to a secure cassette and record the transaction. The depositor=s account will then be updated as appropriate. From time to time, the cassette will then be extracted in a secure manner from the deposit apparatus or, in the case of a recycler, will be used as a source of banknotes for dispensing.

JP-A-20311199 and JP-A-5181894 disclose systems in which cash such as banknotes can be deposited at one location and information relating to the deposited cash is then transmitted to a second location. At the second location, banknotes or other currency corresponding to the deposited currency are loaded into an envelope which is sealed and then dispensed.

There is a need to increase the speed at which cash ownership can be transferred while maintaining security of the cash itself. This is both the case for individuals paying cash into personal bank accounts and for larger commercial institutions transferring large amounts of cash potentially from multiple locations. Retailers are a particularly apt example of commercial institutions that would like to transfer the ownership of cash as rapidly as possible so their account can be credited. Herein particular reference will be made to large retail organisations but it should be appreciated that similar issues are faced by other commercial organisations and to a lesser extent by individuals.

In essence to enable more rapid reconciliation of cash (cash in this instance including banknotes, coin, casino chips, vouchers, cheques, debit/credit card receipts and other near money documents and tokens), and the subsequent crediting of an account it is essential to secure both the physical and virtual movement of cash. That is without securing cash in some physical manner, e.g. within a tamper evident container, the recipient is unlikely to trust any information pertaining to value that may be associated with it. Indeed currently within many cash management cycles even when cash is transported in a wholly secure manner a recipient will still insist on recounting it prior to crediting an account. This also holds true for individuals paying money into a bank account. A teller will always recount cash to be deposited to ensure the correct amount has been passed.

In accordance with a first aspect of the present invention, a method of depositing items of value comprises:

1) receiving a tamper evident and coded container holding the items of value, the code relating to the content of the container;
2) verifying that the container has been received in an acceptable manner, and, if it has,
3) either incrementing an account with the value of the items of value in the container by reference to the code and without opening the container, or, if the account has previously been incremented, leaving the account unchanged.

We have addressed the problems outlined above by utilizing a tamper evident container which is also coded in such a way that its content can be identified without opening the container, and it is possible to allow the container to be handled in a relatively unsecure manner which is particularly advantageous. Indeed, in some cases, the container could be insecure in the sense that it could be tampered with, as long as tampering can be detected.

Thus, the invention overcomes the problems set out above by securely associating the data with the physical tamper evident container. The invention can be implemented in a range of environments encompassing both retailers and financial institutions such as high street retail banks. The current invention may also be implemented at differing levels of sophistication and automation dependent upon the needs of the user.

The code will typically define the total value of the items of value in the container. This may be either directly by the code itself or, more typically, by the code enabling a store or memory, usually in a remote location, to be addressed which contains information defining the total value.

The items of value could be inserted into the container in a variety of ways, for example manually, usually under controlled conditions. However, preferably, the container is loaded automatically. Thus, prior to step 1, the method further comprises supplying the items of value to an item counter and verifier adapted to count and verify the items and to insert the items into and to seal a container.

This is particularly advantageous since apparatus for inserting the items into the container could be located remotely from the depositing apparatus, for example at the premises of a retailer or the like.

In some cases, the code could be printed on the container just before, during or even after the items of value have been inserted into the container. Preferably, however, the containers are provided in advance with unique codes.

In another option, the container is at least partially transparent and contains a code carrier, for example a receipt or header/footer card, printed at the time the container was filled, providing the code such as a bar code, which can be read through the transparent portion. In a further option, the container is opaque but contains a storage device, e.g. a RFID, whose content can be read through the container wall. In either case, a further identification label could be placed on the outside of the container.

Preferably, the method further comprises holding the items of value in an escrow location following the counting and verifying step. In some cases, this enables a user to remove the items before they are inserted into a container. This enables a user to be confident that the correct value is ascribed to the items which he has deposited before they are finally inserted into the container.

Typically, the container is a package made of paper or a flexible plastics, in contrast to conventional stores such as cassettes made from rigid metal boxes. However, in some cases, semi-rigid or even rigid containers (typically mechanically or electronically locked) could be used. The use of a secure cassette as typically used in cash handling equipment for banknotes is advantageous since the notes can then be automatically fed into document sorting equipment at the financial institution.

Tamper evidence could be checked manually allowing the use of plain containers. Preferably, however, positive tamper evident feature(s) are provided. The tamper evident package may be constructed in a variety of conventional ways but we have developed some new packages described in more detail in our co-pending International application of even date entitled A Tamper Evident Container@ (Agents Ref: RSJ07664WO).

In some cases, an account such as a bank account can be incremented with the value of the items in the container immediately after the container is filled and sealed so as to achieve very rapid crediting. Of course, there is a risk that the container will be tampered with and items of value removed before the container reaches deposit location such as a bank or other secure institution. In that event, it will be necessary to decrement the account at a later stage. Alternatively, the account is not incremented until the container has been deposited and steps (1) and (2) of the method successfully completed.

In either event, successful incrementing of the account does not require the content of the container to be reevaluated. This results in a significant increase in speed of crediting accounts.

In order to insert items of value into a container, we provide in accordance with a second aspect of the present invention, deposit apparatus for receiving a sealed, tamper evident container including items of value, the container carrying a code related to the content of the container, comprises a tamper detection system for determining if the container has been tampered with; a code reader for reading the code on the container; and a receptacle for storing accepted containers.

Information derived from the code can be transmitted directly to a remote host or stored locally in a memory, typically for subsequent transmission to the host so that an account can be incremented.

The receptacle may be open or alternatively secure, for example a safe.

Typically, the apparatus will include a transmitter for transmitting the code to a host processor, usually only if the tamper detection system indicates that the container has not been tampered with. If tampering is detected the container will be rejected without the account being incremented. If the account had been previously implemented then it could be decremented or at least flagged pending further inspection of the container.

Typically, the apparatus includes a memory for storing details relating to the expected content of the container derived, for example, from the code. This is then used to increment an account.

The tamper detection system can be of any conventional form as is well known to persons of ordinary skill in the art. A particularly preferred system includes a radiation source and detector adapted to monitor the luminescent, e.g. fluorescent, response of a container to radiation from the source, and a processor responsive to the luminescent response of the container to determine if the container has been tampered with. This would be used in conjunction with a container which exhibits a particular pattern of luminescence when untampered and a different pattern when tampered with.

Typically, information relating to a package will be held in a remote host which may or may not be the same as the institution holding account details.

Preferably, the apparatus further comprises an escrow store in which containers can be temporarily stored prior to being inspected by the tamper detection system. This enables a number of containers to be processed by the apparatus without an operator having to wait for each to be processed before presenting the next.

Preferably, the apparatus further comprises a reject outlet to which containers are supplied if the tamper detection system determines that a container has been tampered with. These containers could be returned to the operator but conveniently the reject outlet is inaccessible to the container depositor so that the containers are held securely for subsequent inspection.

Containers could be manually loaded and provided with codes if this could be done under satisfactory secure conditions. However, some form of automatic loading is preferred and in accordance with the third aspect of the present invention, we provide container loading apparatus comprising an inlet for receiving items of value; a transport system for feeding the items of value from the inlet; a monitoring system for monitoring items of value fed to it by the transport system; a container loading system for loading acceptable items, as determined by the monitoring system, into a container; means for providing an overt or covert indication of the content of the container; and a container closing mechanism for closing the container such that the indication is detectable from outside the container.

In accordance with a fourth aspect of the present invention, a method of loading items of value into a container comprises feeding the items along a transport path; monitoring the items for acceptability; loading acceptable items into a container; providing an overt or covert indication on or in the container relating to its content; and closing the container such that the indication is detectable from outside the container.

This enables items of value to be securely loaded into containers and minimises the risk of fraud.

In the case of plastic containers, the container closing mechanism can comprise a sealer but other closing mechanisms will be chosen in accordance with the manner of closing the container. For example, a lock actuator or the like could be used.

The items of value could be held loosely in the container but, particularly in the case of documents, the apparatus preferably further comprises a banding mechanism for placing a band around the items of value prior to loading them into a container.

Typically, containers will be supplied individually to the apparatus by the user although the apparatus may further comprise a container supply system for supplying containers from a store to the container loading system.

The amount of inspection carried out by the apparatus can be determined by the application. In a simple case, the monitoring system comprises a counting and verifying system for counting and verifying the items of value. In addition to this, however, the system may further comprise an item identifying device such as a pattern recognition system or the like. This is particularly suitable when handling banknotes and other readily recognisable items.

The indication (or code in other embodiments) is typically visible although it could be covert, e.g. only detectable under i.r. illumination.

The indication providing means preferably comprises a printer which can be located downstream of the container closure mechanism so as to print the indication such as a code e.g. a bar code onto the outer surface of the container or alternatively onto a label which is affixed to the container. Alternatively, the printer may be adapted to print the indication on an insert, the container loading system being adapted to load the insert into the container such that the indication is detectable, typically visible, through a window of the container.

In a further alternative, preprinted inserts or tags could be used.

In some cases, the apparatus further comprises an escrow location downstream of the monitoring system and upstream of the container loading system, for example to allow a user to retrieve the items of value before they are loaded into the container. However, an escrow is not essential.

In a preferred embodiment, the apparatus is coupled with, or even incorporated in, a retail till or cash point at least for electronic communication with the till or cash point. This assists in achieving good concordance between the items of value loaded into the container and those expected from the till or cash point. In a particularly convenient approach, the inlet of the apparatus is connected to the till or cash point to receive items of value therefrom. This minimises the risk of fraud during the transfer from one to the other.

Within the apparatus, a variety of known approaches may be used for handling the items of value. For example, unrecognised items of value could be fed to a reject outlet or to a secure store for subsequent inspection. The transport system could be stopped if an unrecognised item of value is detected causing the operator to extract the item for subsequent inspection.

The container loading apparatus could form part of an item of value dispenser or recycler.

In order to restrict use of the apparatus, the apparatus may further comprise a control system which can only be activated by an operator inputting a pass code. To that end, the apparatus conveniently further comprises an input device to enable the pass code to be entered, the input device comprising one or more of a keypad, magnetic stripe reader, smart card reader, biometric reader and the like.

The apparatus may also includes means to allow separator cards, headers and footers to be inserted into the container at appropriate positions. These may be printed with information relating to the source of the items etc.

Typical enhancements of the container loading apparatus include:

- The apparatus may have the ability to place cash in to a single container or multiple containers and data relating to the filling process be provided to each container.
- Multiple containers may be placed into a single secure store.
- There may be multiple stores for the containers.
- The visual indication can contain data which may include operator ID, date, time, transaction details or reference numbers, value and mix of documents processed, account details to which the value of the transaction is to be credited, security details or code. Some of this information may be entered via a smart card.
- Ability of the user to input supporting information.
- Production of receipts.

The items will typically be documents of value such as banknotes, travelers cheques, vouchers, credit/debit card receipts, personal cheques etc. but could be other articles such as coins.

Some examples of methods and apparatus according to the invention will now be described with reference to the accompanying drawings, in which:—

FIGS. 9A and 9B illustrate an example of a suitable package for containing items of value;

Figure 1:
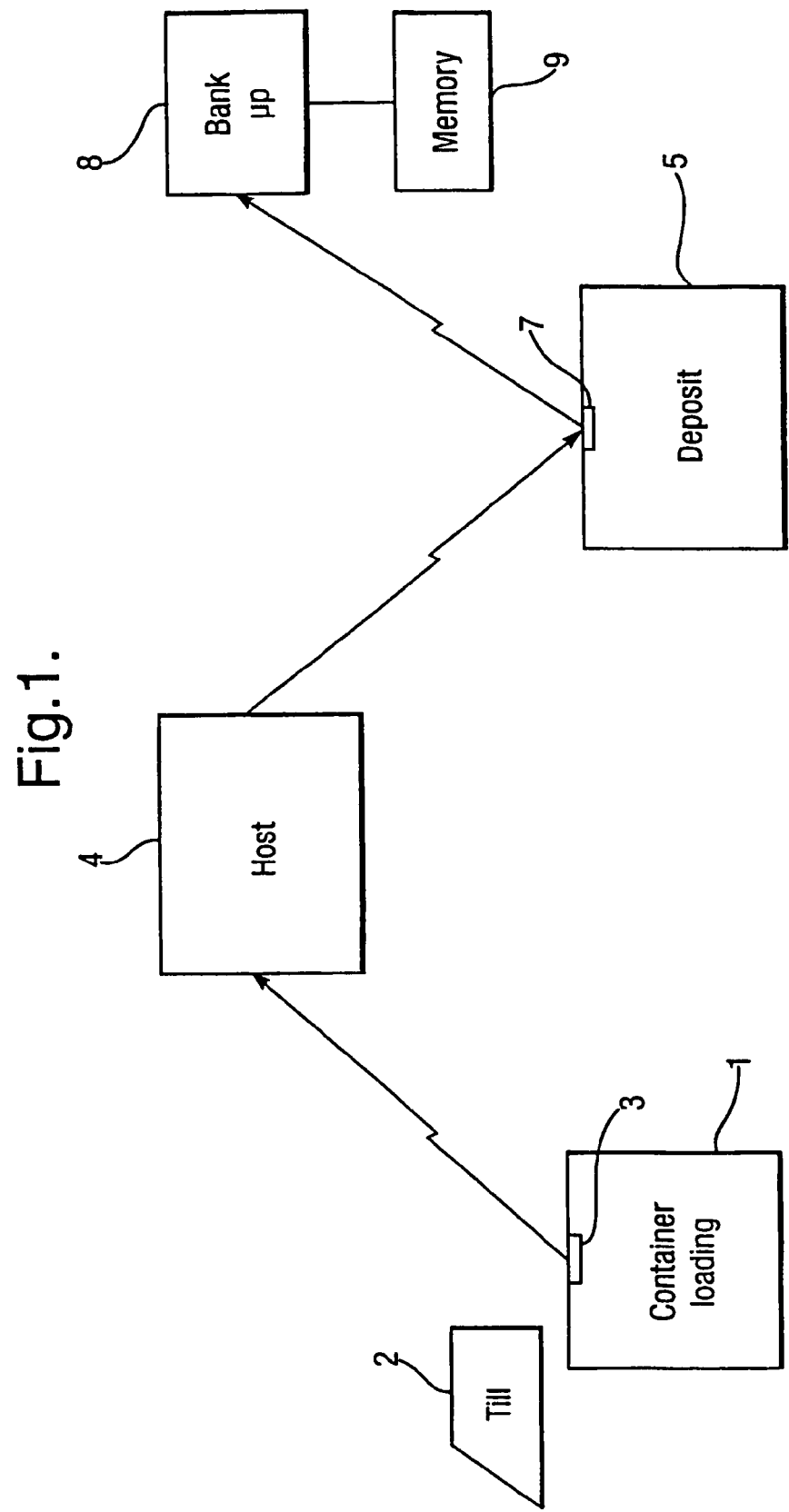
FIG. 1 is a schematic block diagram of an example of apparatus for depositing items of value.
Figure 2:
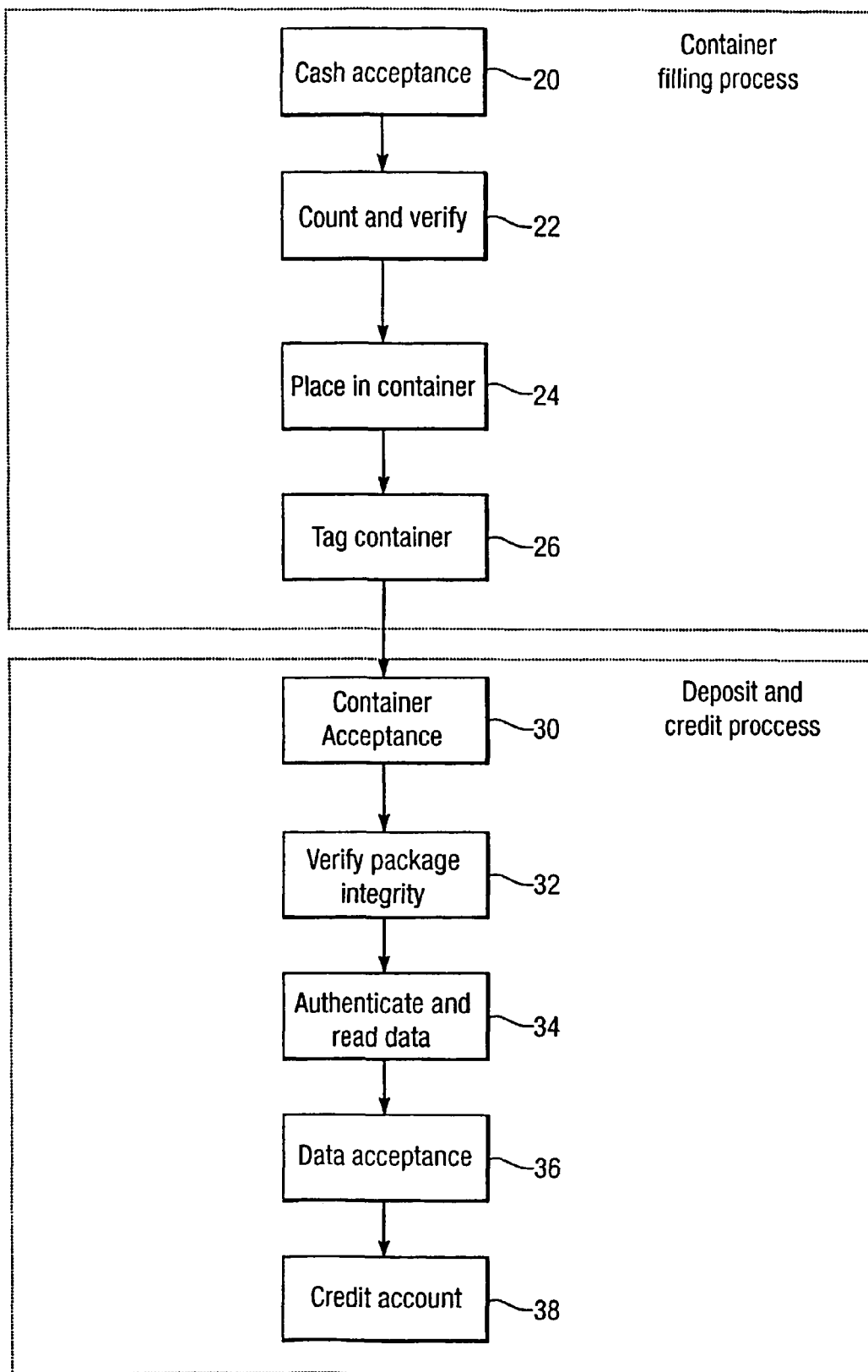
FIG. 2 is a flow diagram illustrating the primary steps in the process of operating the apparatus shown in FIG. 1.

The overall apparatus is shown in FIG. 1 and its mode of operation set out in FIG. 2. Thus a container loading system 1 is located at a source location such as a retailer, typically in association with one or more tills 2. In some cases, the container loading apparatus may be physically connected to the tills, or even located within a till, so that bank notes and/or coins etc can be transferred from one to the other in a secure manner. The container loading apparatus 1 receives (step 20) the items, counts and verifies them (step 22) loads 24 the supplied banknotes and coins into a tamper evident package or envelope which is sealed, and provides 26 the envelope with a unique code such as a bar code. In some examples, the bar code defines the value of the contents of the package while in other examples, that information is supplied separately via a modem 3 to a remote host 4 where it is stored and can be accessed using the unique bar code. The sealed, tamper evident envelope is then transferred, typically in a non-secure manner to a destination location where deposit apparatus 5 is located. The destination location could comprise a financial institution such as a bank or a cash-in-transit operator or the like. At the deposit apparatus, the package is accepted (step 30) and its integrity is verified (step 32) to check that it has not been tampered with. The bar code is then read (step 34) and any other verification steps needed are carried out. If the bar code constitutes a look-up address then the host 4 is accessed via a modem 7 to enable the value of the contents of the package to be determined. Once this has been done and any other acceptance checks completed (step 36) the information is supplied to a bank or other financial institution 8 having a microprocessor which causes the account of the owner of the items of value to be credited (step 38), the account being held in a memory 9.

In other examples, a link may be set up between the host 4 and the bank 8 directly so that the account in the memory 9 is immediately updated following sealing of a package by the container loading apparatus 1. In that event, the deposit apparatus 5, once it has verified the integrity of a package, will simply confirm to the bank 8 that the credit is valid. Alternatively, if the verification check fails the entire package can be cancelled in which case the account will be debited.

Figure 3:
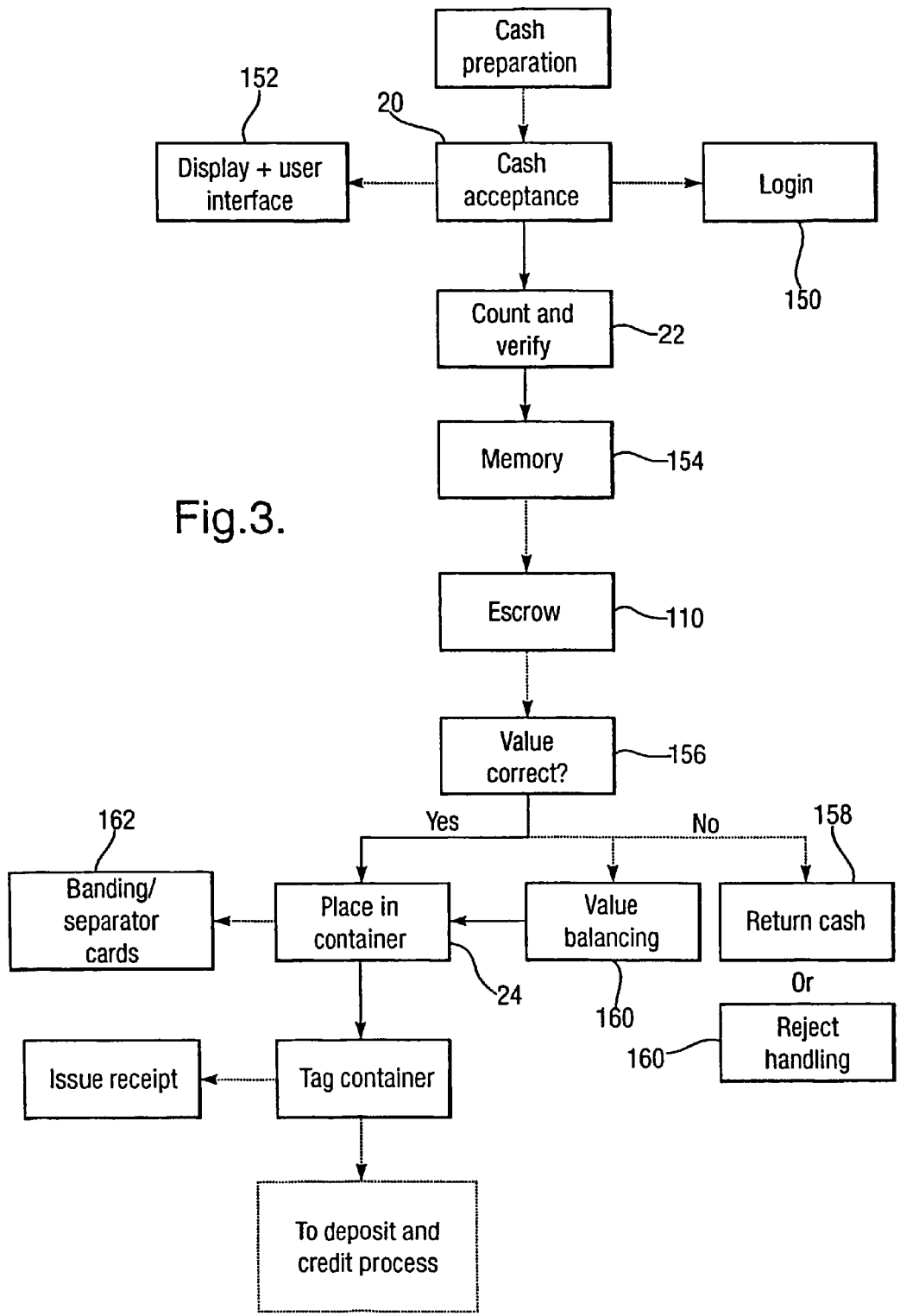
FIG. 3 is a more detailed flow diagram of the container filling process.
Figure 7:
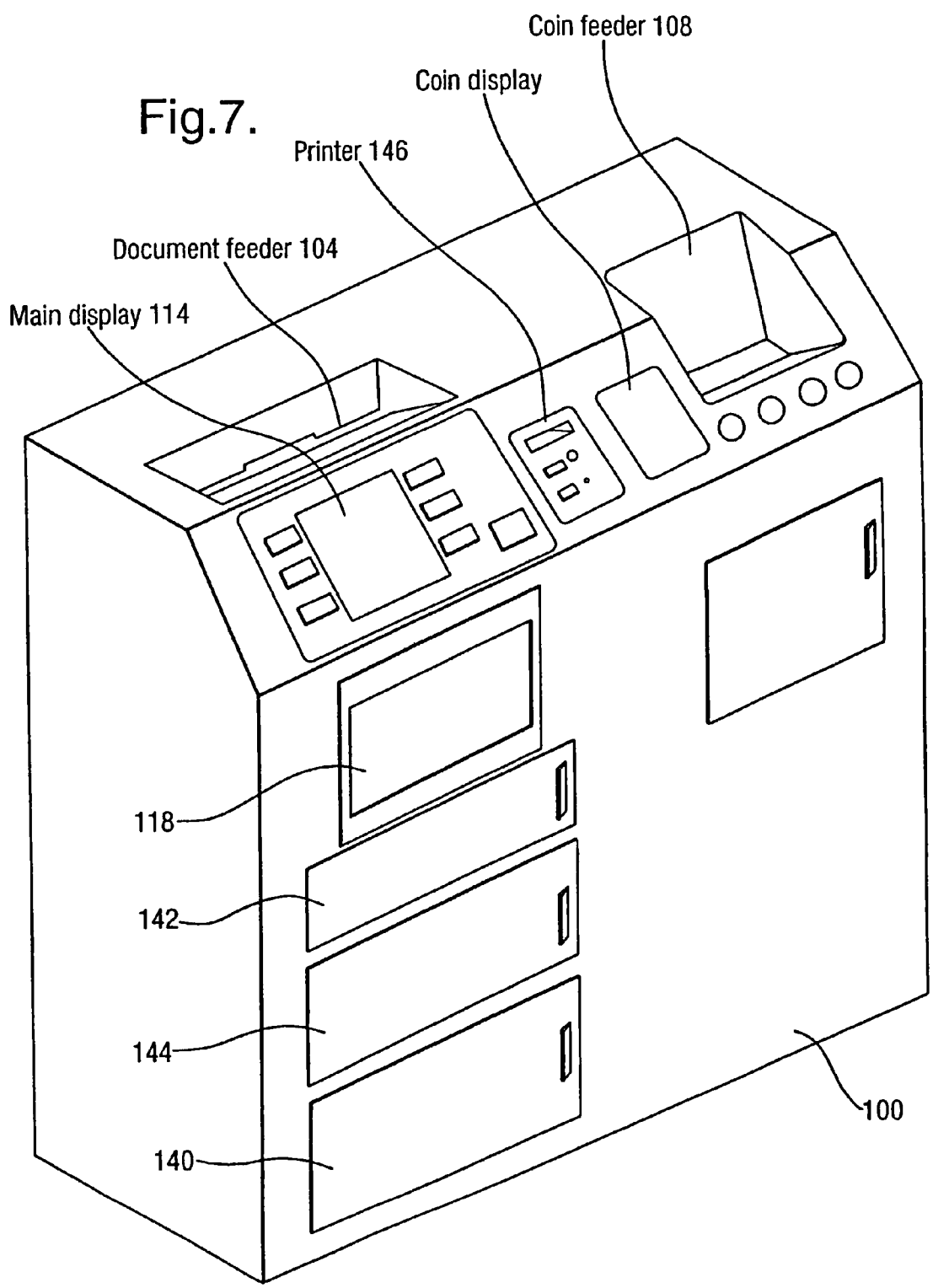
FIG. 7 is a perspective view of a container loading apparatus.
Figure 8:
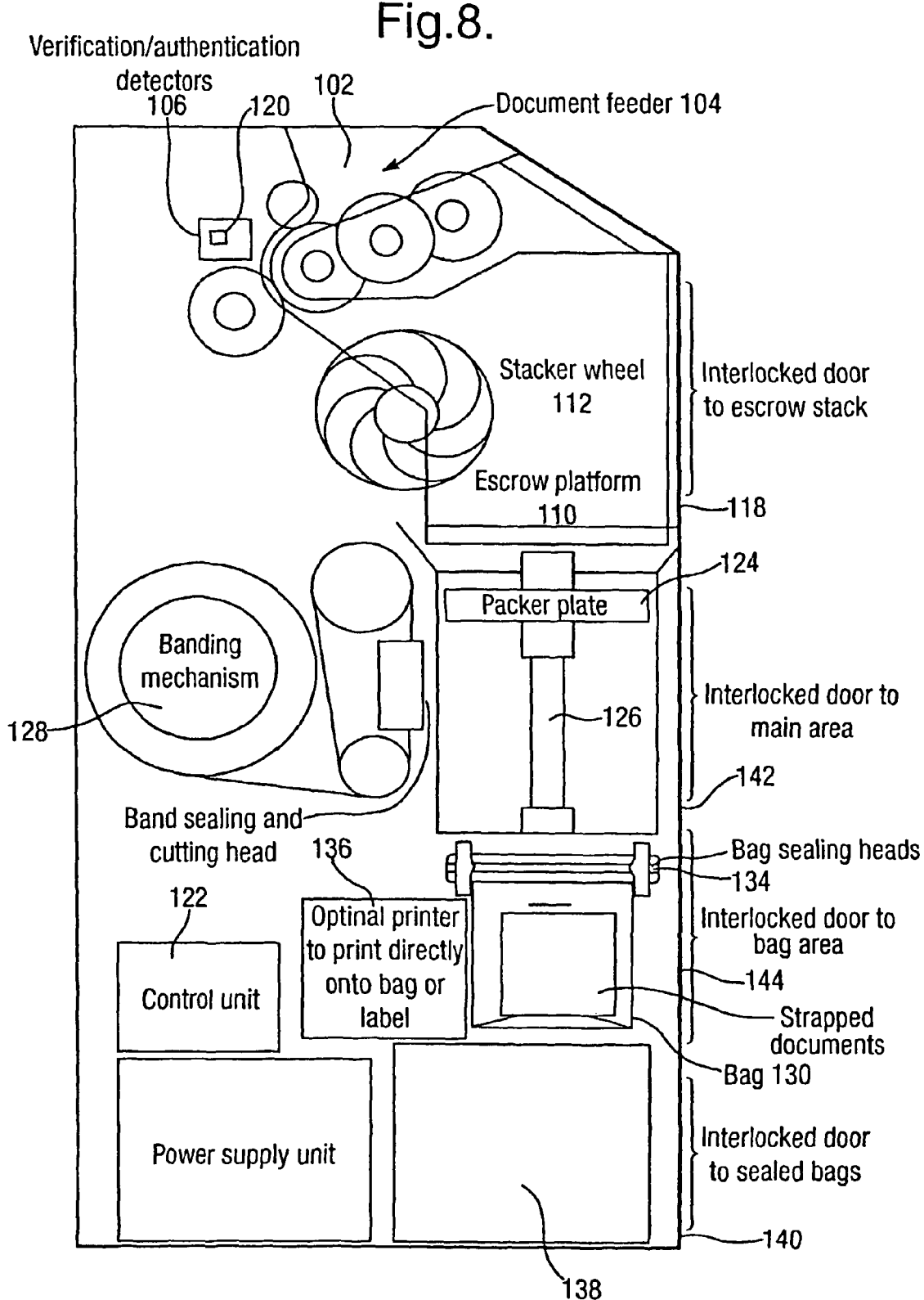
FIG. 8 illustrates the main components of the apparatus shown in FIG. 7.

In order to load documents such as banknotes or other value tokens securely into a sealed envelope, the loading apparatus is provided mounted within a secure housing 100 (FIG. 7). The housing 100 could be mobile (by mounting on wheels) so that it can be taken to different tills etc., and would then be battery powered or have flying leads. It could be built into a small powered vehicle, typically electrically driven, suitable for driving around inside a large store, shopping mall, or airport concourse. Alternatively the housing may form part of the retail till 2 itself or part of a back office cash management solution. The apparatus 1 could be arranged so that it can only be operated by authorised users, e.g. by requiring the operator to present a smart card or equivalent to switch the system on and/or including means to identify the operator of the till the cash is being received from, e.g. smart card, biometrics, or PIN (indicated at 150 in FIG. 3). Information to assist the operator is displayed 152 on a main display 114 (FIG. 7).

The user interface may be a traditional PC with a keyboard 160 and a mouse or other pointing means such as a touch screen. The interface provides the means by which the user can easily interact with the cash handling apparatus. Dependent upon the nature of the transaction the user may be requested to login and identify themselves. In the context of retail the user may also be requested to identify the till from which the cash originated.

The loading apparatus comprises an input hopper 102 above a document feeder 104 of conventional form which feeds documents past a banknote counter and verifier 106 which may be based on the De La Rue 2650 machine. This counter and verifier 106 will check input banknotes for one or more of fitness, authenticity using for example UV fluorescence, IR response, magnetic thread presence and the like and also denomination using either size or pattern recognition. The document feeder 104 and verifier 106 may be based on any apparatus capable of accepting and verifying notes.

In addition, a cheque reader, such as a MICR reader, could be provided, for example for reading cheques printed by the till.

The loading apparatus may also have the ability to dispense notes and potentially may even have recycling capability (not shown). A memory 120 within the counter 106 is incremented 154 with the value of authenticated banknotes, the banknotes being loaded onto an escrow platform 110 by a stacker wheel 112. (The escrow stage is optional).

When the notes are held in the escrow, the user is prompted with the value counted and asked to confirm the value. If the value is confirmed the notes are moved to the container. If, however, the user indicates the value is incorrect the notes may be returned 158 to the user via a door 118 to refeed or alternatively the user could be prompted to enter the expected value. If the latter route is taken after the user has entered the expected value the notes can be moved to the container and in addition the details of the query is sent to the memory for storage.

Alternatively the apparatus may automatically reconcile the counted and verified cash against Electronic Point of Sale (EPOS) data provided by a till 2. In this case the user will not be prompted to confirm the machine total. The EPOS data may be supplied real time by a direct link between the till and the apparatus or alternatively this information may be provided by some other means e.g. receipt generated by the till in suitable machine readable format such as bar code.

If a banknote is not recognised, the counter 106 will stop the feeder 104 with the unrecognised note being fed to the escrow 110 and a message will be displayed on a display 114 to enable the user to remove the notes through a door 118 and refeed them. Alternatively, suspect notes could be fed to a separate hopper (not shown).

The loading apparatus is also provided with the capability (not shown) to count and verify coins and other value tokens supplied through a coin feeder 108. In other examples, the apparatus could handle coins and not banknotes or vice versa. Further to this a scanner (not shown) could be provided for cheques and credit/debit card receipts.

Figure 4:
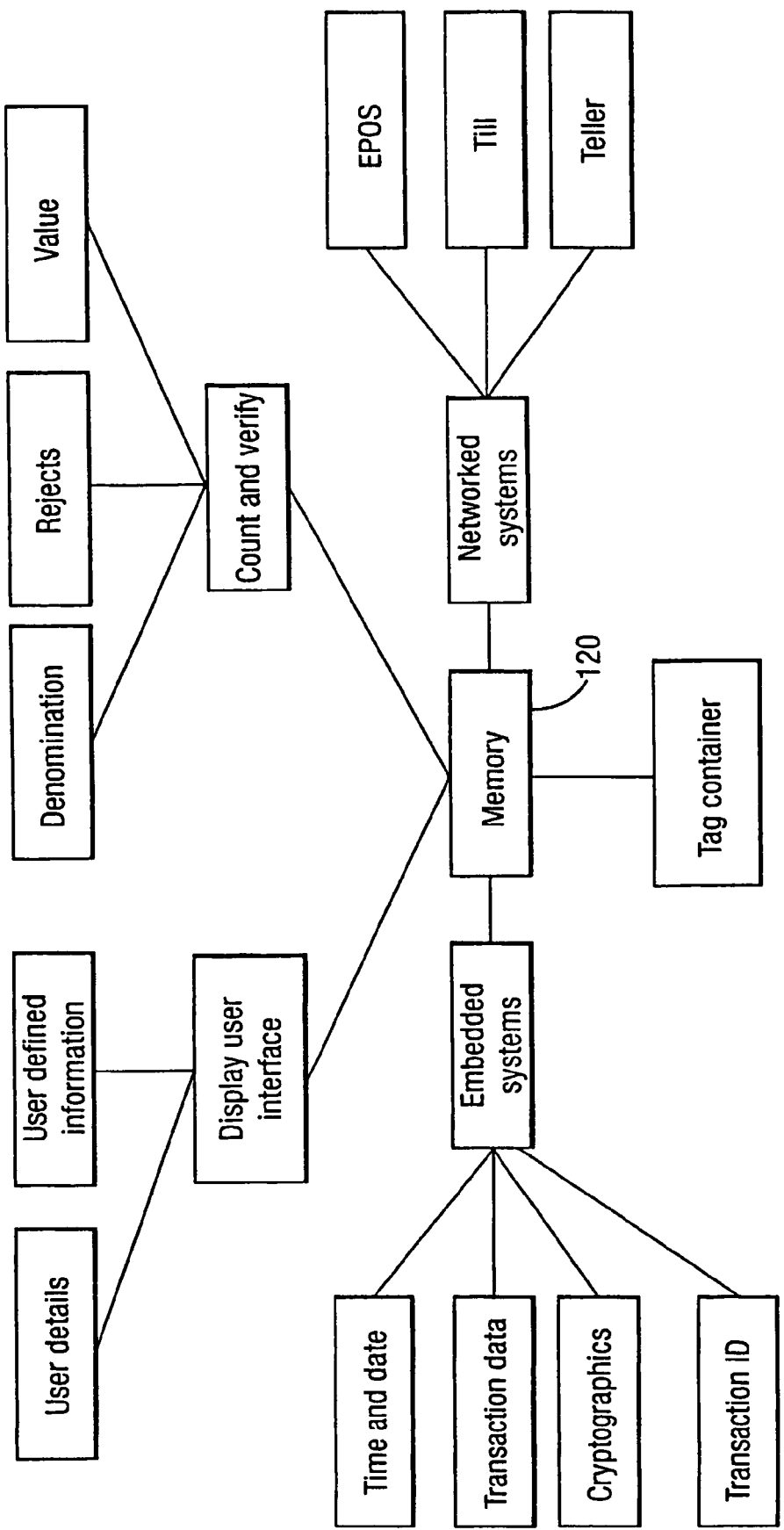
FIG. 4 illustrates possible contents for the memory of the container loading apparatus.

FIG. 4 illustrates the range of data which could be stored in the memory 120 within the counter.

The apparatus 1 may include an online endorser or shredder to cancel cheques and vouchers. Alternatively, the apparatus could include a known mechanism for damaging 160 the notes to prevent reuse.

Although documents will normally be manually supplied to the apparatus 1, a docking station could be provided on a till 2 for connection to the system and allowing automatic transfer of documents.

Separator cards may be fed 162 by the operator at the start and end of the transaction, possibly with other cards fed between banknotes, cheques and vouchers, and/or between denominations. These cards may contain a code that is read by the envelope or bag filler equipment and causes it to reconfigure any relevant detectors and/or settings to be suitable for the following documents.

In addition to banknotes, the system could be adapted to handle other documents kept in the till relating to the value of transactions such as credit card receipts and receipts from skimming. The system could also carry out on-line reconciliation with the till.

In another modification (not shown), the system could include an on-line printer to print and insert headers and/or footers into the bag or envelope. In addition, an input pad, e.g. keypad or touch screen, is provided to allow an operator to input supporting information to the transaction data. E.g. information about reject documents or reference to a till skimming receipt.

Once the user confirms that the machine total is correct, he indicates this to the system controller 122 through the input device 160. At the same time, the user may indicate how the money is to be credited, typically by entering a bank account number and the like. The system controller 122 will then cause the banknotes to be transferred in a conventional manner to a packer plate 124 mounted on a lead screw 126. Here the pack of banknotes is banded 162 by a banding mechanism 128 and then dropped into a bag 130 supported in a bag area 132. The bag is manually located in position. In other cases (not shown), the bag can be automatically supplied from a store. In that case, the bag or envelope can be opened using a vacuum or mechanical device. Banding the pack of banknotes holds then securely together and may also secure the separator or header and footer in the correct position within the pack should such features be utilized.

An envelope or bag sealing system 134 supports the bag 130 and includes a sealer for sealing the open end of the bag once all documents and other items have been loaded. The bag may already be provided with a unique id in the form of a bar code which can be read by a bar code reader (not shown). This bar code will be unique to, and preprinted on, the bag and thus provide a unique reference to the contents of the bag and the account to be credited. Alternatively, as shown, the bar code could be printed on the bag, typically after sealing, by a printer 136. In this case, the bar code could encode other information such as the value of the bag content.

The unique code may be transmitted by the system controller 122 to the host 4 typically located remotely from the loading apparatus 1 where the information is retained in a store (not shown). This communication may be by the Internet, PSTN etc.

In general, selected data from the memory 120 may be stored on or in the bag 130 by any number of means for example barcodes, RFID, IC chips, magnetic storage media, optical storage media, magneto optics, solid state memory etc. The data may be encrypted prior to being stored on or in the container to further increase security. RFID tags allow a >track and trace=system to be used. Thus, RFID tags can record operators, using a smart card to identify themselves, and various readers, for example at a safe or a door, which record the location of each envelope and the person responsible for it at any given time.

The code could include a time limit, which could be used to reduce the time available for the bag or envelope to be tampered with, i.e. envelopes received >late=would be put to one side for inspection. This is just one means by which the non-physical integrity of the envelope and its contents can be validated. Alternatively the information could be encrypted prior to application, the deposit apparatus having suitable means for decrypting the information. As a further alternative the system 1 could be connected to a financial institution to obtain an authorisation code. Therefore, the financial institution, e.g. a bank, knows when a transaction has happened, possibly some details, and the acceptance machine knows what to expect. Unexpected envelopes can be rejected or quarantined. The envelopes could be put into different locations within the machine, i.e. all cash envelopes are put into one bag, all cheques in another etc. or alternatively all envelopes from one till could be collated into one envelope. One or a combination of several or all the above alternatives could be utilized within a system.

The data may simply contain information relating to the value, denomination split, time of filling etc or may include additional data. For example, if there were suspect or reject notes within the count this could be highlighted and the recipient would know further inspection of the contents is required. Also if an escrow was present and the user rejected the count value but entered an expected value this could be highlighted for closer inspection.

It will be appreciated that although a 1D bar code has been described in this example, there are many other types of code which could be used such as 2D bar codes, random numbers and the like. Furthermore, the code could be printed on one or both sides of the envelope and/or in different positions on the envelope so that it can be easily detected and read.

In summary, the code could simply define a unique number but could be used additionally to address one or more of the following types of information stored in the store 120:

ID for the user operating the filling machine
Filling machine ID
Time of fill
Amount in envelope
Contents of envelope, denomination, currency type, total value, value denomination
Destination of deposit, bank account number and type
Specific instructions how the deposit should be handled
ID of transaction
Method on how the envelope will be deposited
How the deposit will take place.

As an alternative, when using apparatus which can separate suspect and non-suspect notes into two feed paths, rejects may be placed in a bag and the bag provided with information relating to the reject. The non-suspect notes accepted during the transaction would be placed in a different bag and in addition to the standard information also be provided with information relating to the reject. The two bags will also be provided with information to allow a recipient to link and cross reference the containers and thus the reject and non-suspect notes to a single transaction.

Figure 5:
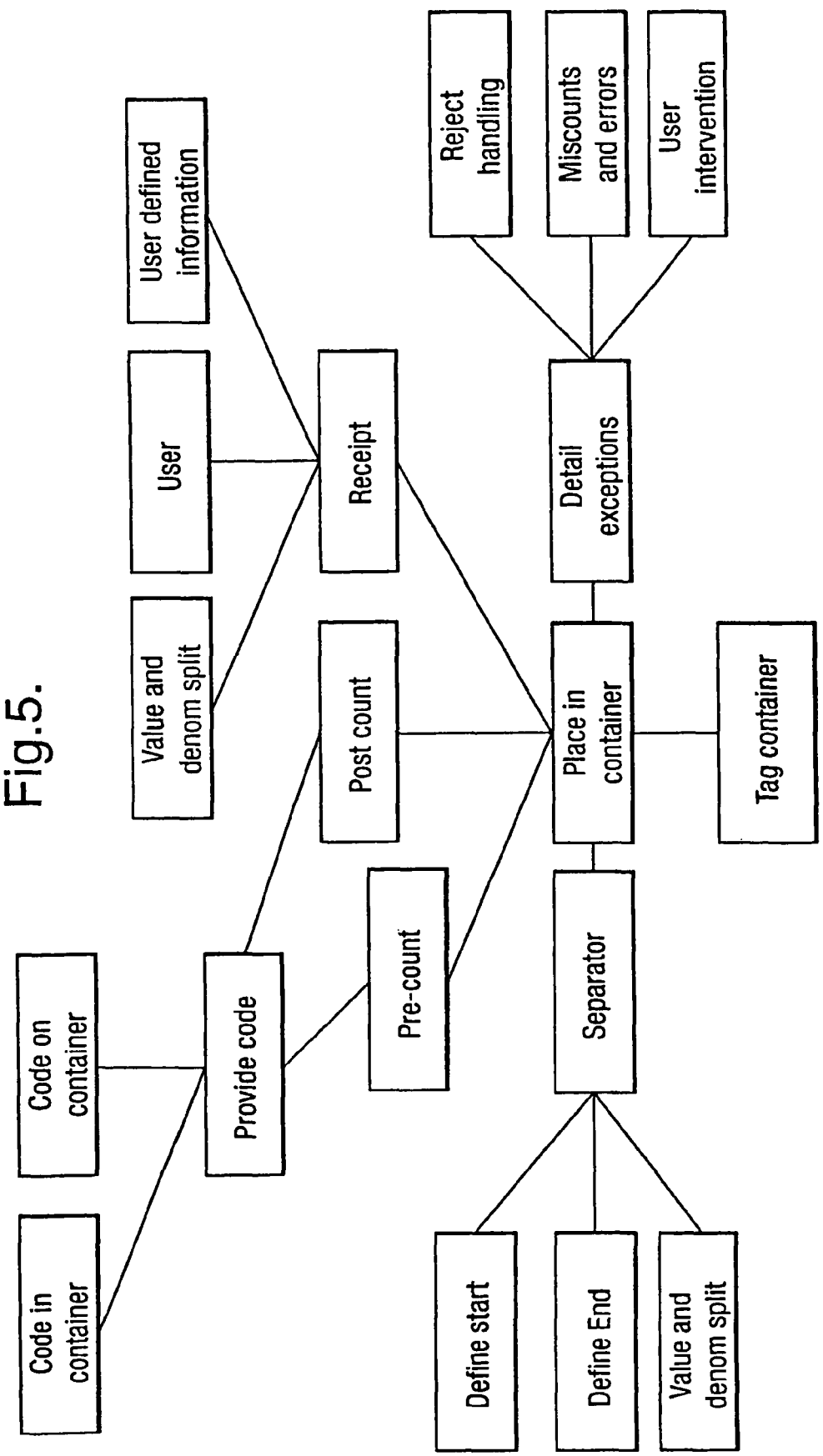
FIG. 5 illustrates different steps which may be taken during the container filling process.

The various possibilities for actions at this stage are summarized in FIG. 5.

After sealing, the bag 130 is dropped into an outlet receptacle 138 from where is can be retrieved via a door 140. Doors 142,144 are provided to access other parts of the apparatus to recover jams etc.

A receipt will also be issued using a printer 146.

In other methods, the bag 130 may be sealed manually by the operator and not automatically. This may use any of the methods described before or may use a tamper indicating >tie-wrap=style tag, a large range of which are already available.

In another arrangement with suitable apparatus (not shown), the documents could be sorted by denomination, condition, type (banknote, cheque) etc. into different locations for loading into different envelopes.

Now that the counted and verified banknotes are contained within the sealed, tamper evident bag, if that bag is maintained in a relatively secure environment, it is possible to effect changes of ownership of the money without physically transferring the banknotes themselves, with a bank account being incremented immediately.

However, in the preferred embodiment illustrated in this example, the sealed bag can be taken in a relatively unsecure manner to the banknote deposit apparatus 5.

The transfer could be effected by post, by a retailer, or using a cash in transport (CIT) company. In this latter case, the CIT company could carry out the sorting and packaging while in transit.

Figure 6:
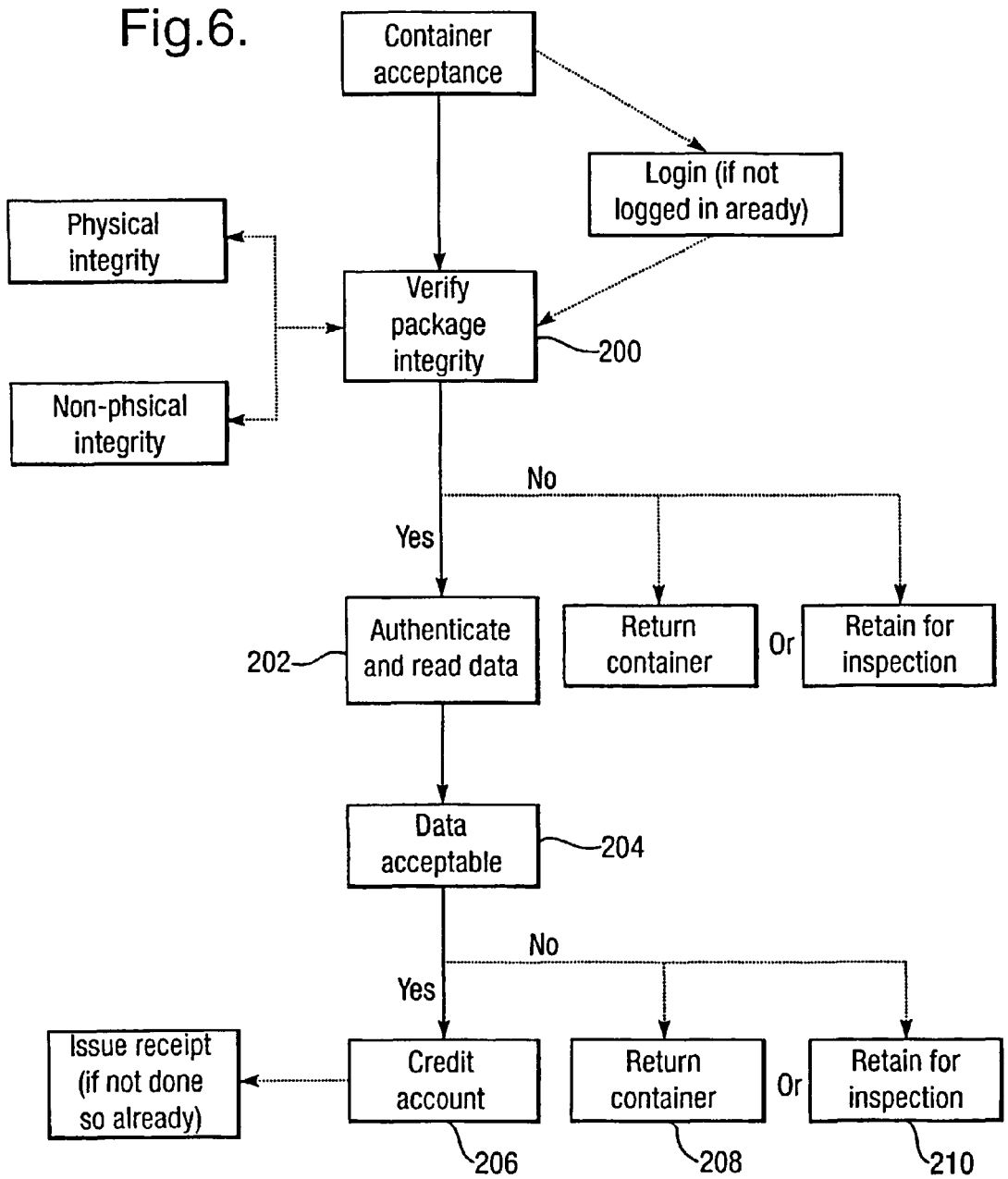
FIG. 6 illustrates the deposit and credit process in more detail.

The envelope or bag is then supplied to the deposit apparatus 5 which includes a bar code and tamper evident reader (to be described below). If the envelope has not been tampered with (step 200, FIG. 6), it will be fed to a, typically secure, drop deposit acceptance unit (not shown) while information 202 from the bar code is passed back to the host 4. The host 4 can then determine from the bar code the value of the banknotes in the envelope by reference to information in its store. This information, if acceptable, 204 is then passed and the appropriate account is credited 206. A receipt may be issued 212 by the deposit apparatus 5 or bank 8.

If the account has already been credited when the bag was filled (as described above), the account could be debited if the bag is tampered with or fails to reach the deposit apparatus 5 in the specified time.

If the data or bag is unacceptable, it may be returned to the operator 208 or retained for inspection 210. In that event, if an account has already been incremented, it could be decremented or marked or flagged to indicate it may not be correct.

Alternatively, the bag may be inserted into a night safe that has an input pad where the operator can type in a code that is related to the bag and/or the user. This code could be used to identify the bag therefore, in this version, the night safe does not require a code reader.

While an in-built reader is provided in this example, a handheld device could be used.

Alternatively the contents of the envelope or bag may be removed automatically by a counting/sorting apparatus within a CIT or banking institution. This is preferable where the envelope comprises a rigid or semi-rigid container and can be >docked=into the apparatus. The docking process also allows the transfer of the information describing the contents of the envelope.

An example of a tamper evident envelope 130 is shown in FIGS. 9A and 9B. FIG. 9A illustrates the envelope 130 in its unsealed condition having a lower leaf 318 secured along edges 301,302 (by pressure sensitive or, preferably heat seal adhesive) to an upper leaf 319 and defining a space 320 therebetween. In practice, the leaves 318,319 may be formed by simply folding a single laminate about a line 321. As shown in FIGS. 9A and 9B the lower leaf 318 defines a flap portion 322 carrying a self-adhesive strip 304 having a cover strip 305 pre-applied so notes/documents inserted into the envelope do not attach themselves when the envelope is filled. The adhesive used for the strip 304 and between the leaves 318,319 will achieve a bond strength greater, that is higher, than achieved within the triple layers of the envelope material (to be described). This is to ensure that unauthorised opening can be detected. Examples of suitable adhesives are HB-Fuller SE5235, SE5269 which are water based or Ashland Adhesives 390M which is solvent based. The adhesive SE5235 could also be used as a pressure sensitive adhesive for the sealing of laminate envelopes. After documents have been inserted into the envelope 130, the strip 305 is removed, and the flap portion 322 folded over and adhered to the upper leaf 319. Any conventional means can be used to achieve automatic folding and sealing. The sealed envelope can now be handled in a relatively unsecure manner which is particularly advantageous.

In this example the envelope 130 has also been coded, using a bar code 309, in such a way that its content can be identified without opening the container. In this instance the code is pre-printed, as previously described, onto the container so as uniquely to identify the container or envelope/bag, the code enabling a store or memory to be addressed which contains information defining, amongst other things, the total value of the contents.

Each leaf 318,319 is made up of a triple laminate of layers 323-325 respectively. Each layer 323-325 comprises a polyester material containing titanium dioxide so that it presents a white, opaque colour under normal, white light illumination, each layer then being provided with a different fluorescent additive. The layer 323 has an orange fluorescent additive, the layer 324 a green fluorescent additive, and the layer 325 a yellow phosphorescent additive. Suitable additives can be obtained from Imperial Materials.

Under non-white light, eg UV, illumination the layers 323-325 will fluoresce in accordance with their particular additives. If the envelope 130 has not been tampered with then only the outer, orange fluorescence will be visible. If, however, an attempt has been made to scratch information from the surface of the envelope or to cut the envelope, there will be a change in the resultant visible fluorescence which can be detected. In some cases, damage could be detected using visible irradiation, for example if a brightly coloured material is exposed and this is visible in normal light.

Figure 10:
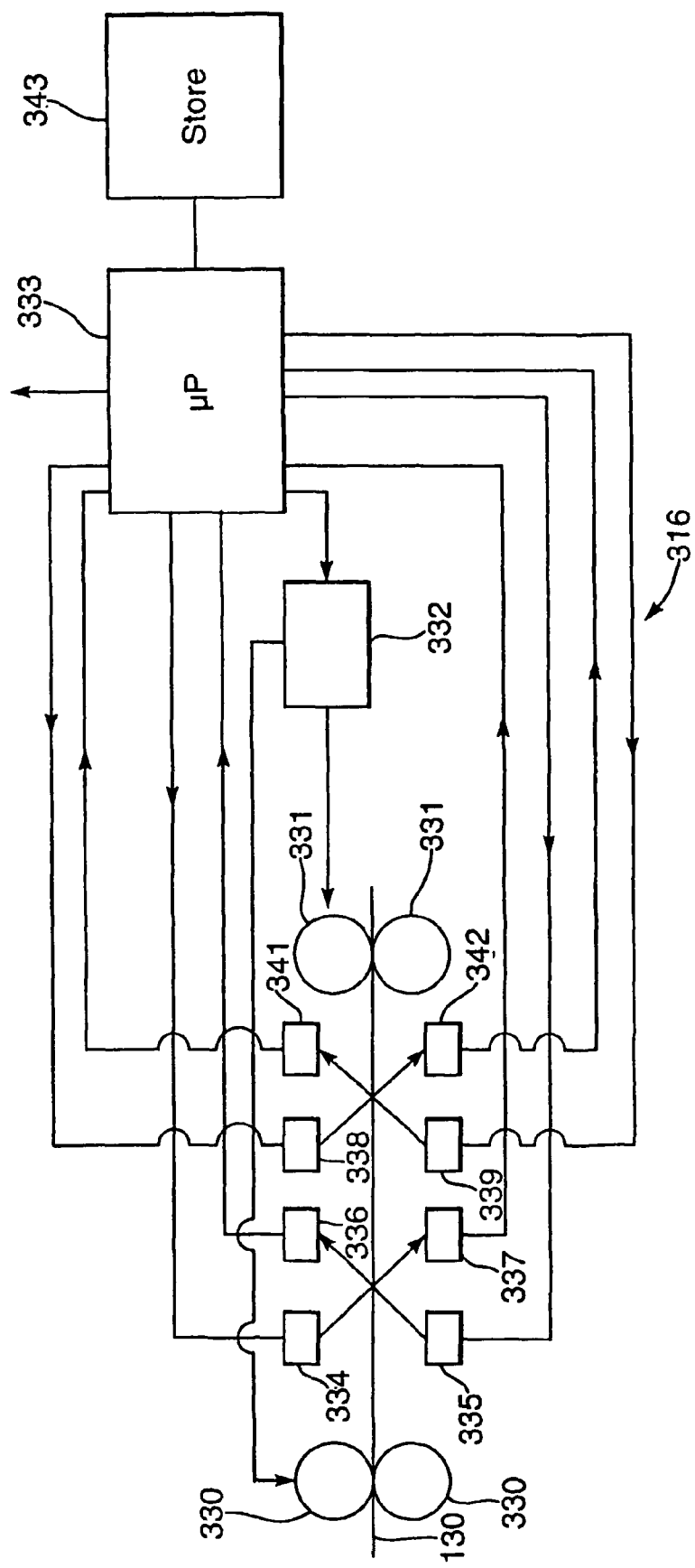
FIG. 10 illustrates a bar code and tamper evident reader for use in the deposit apparatus; and, FIGS. 11 to 20 illustrate in diagrammatic form several alternative embodiments of the invention as defined generally in FIG. 2.
Figure 12:
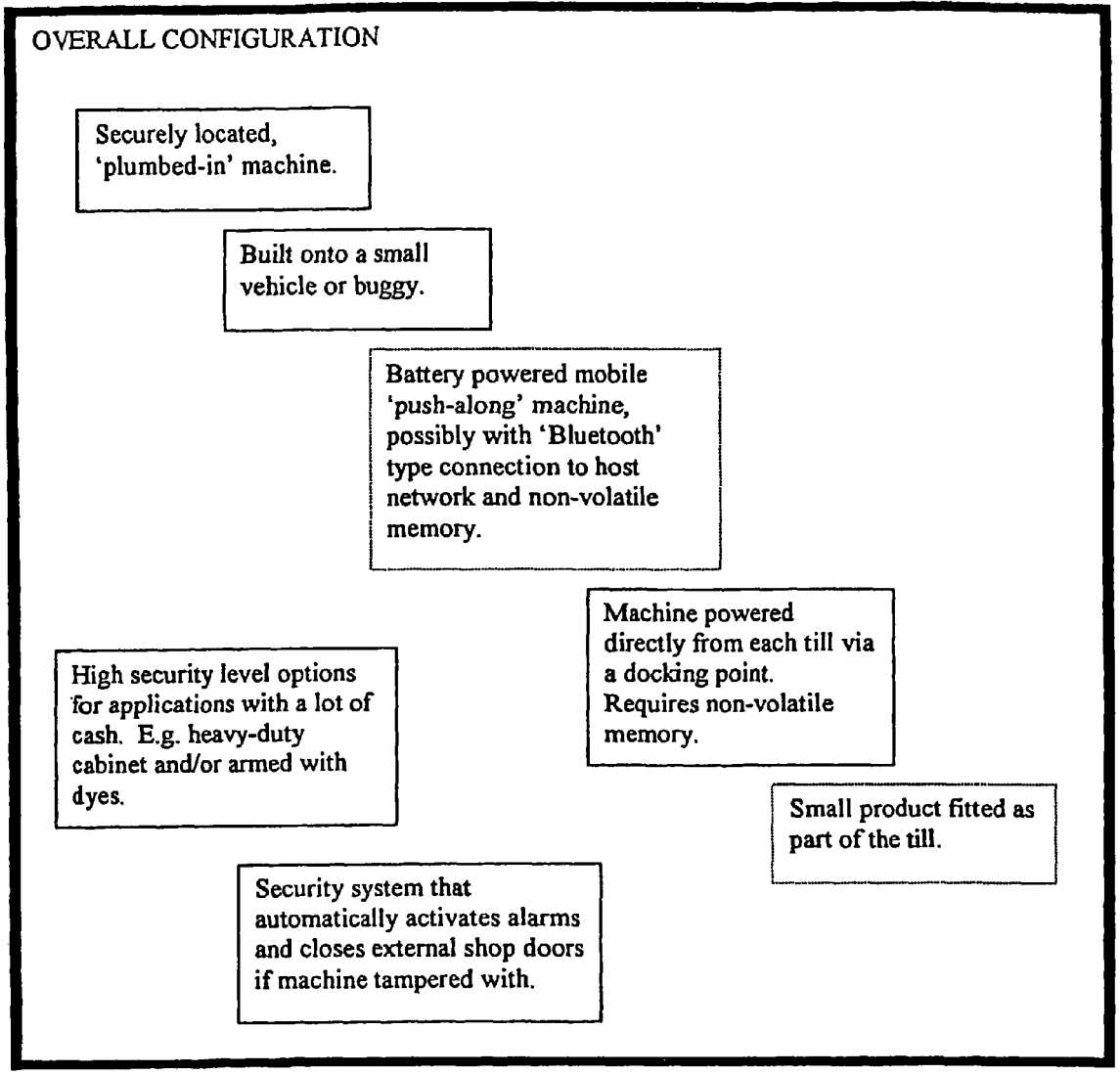
Figure 13:
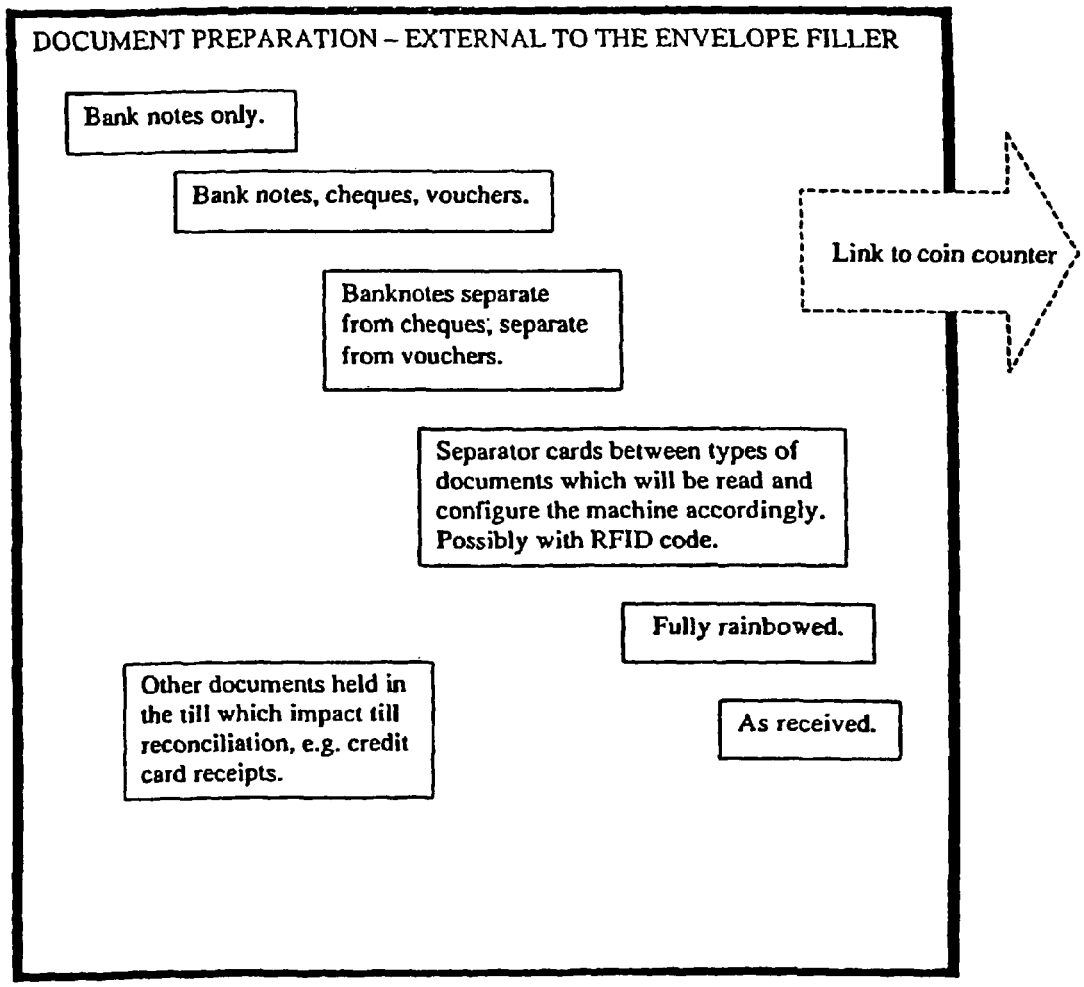
Figure 14:
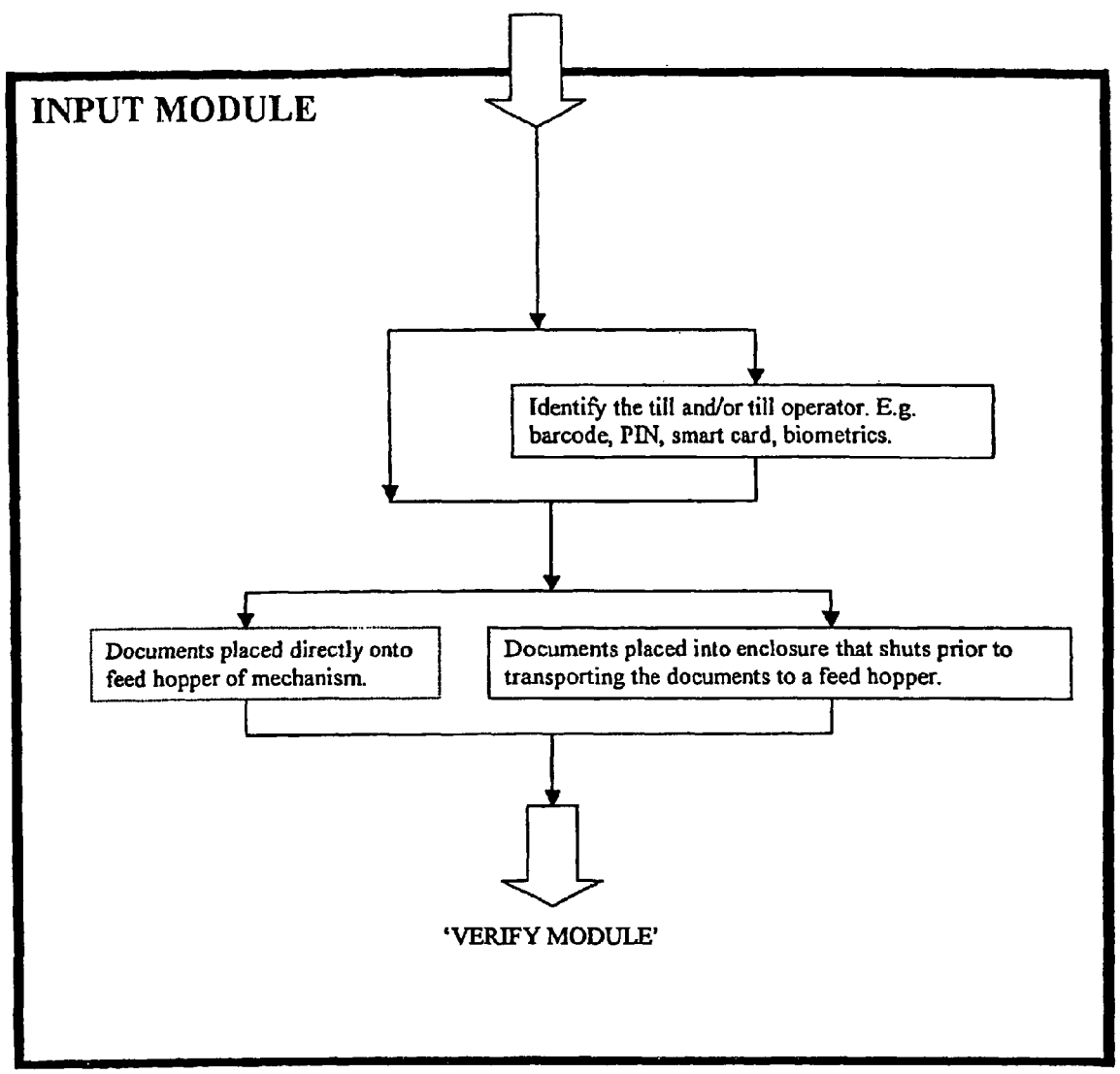
Figure 15:
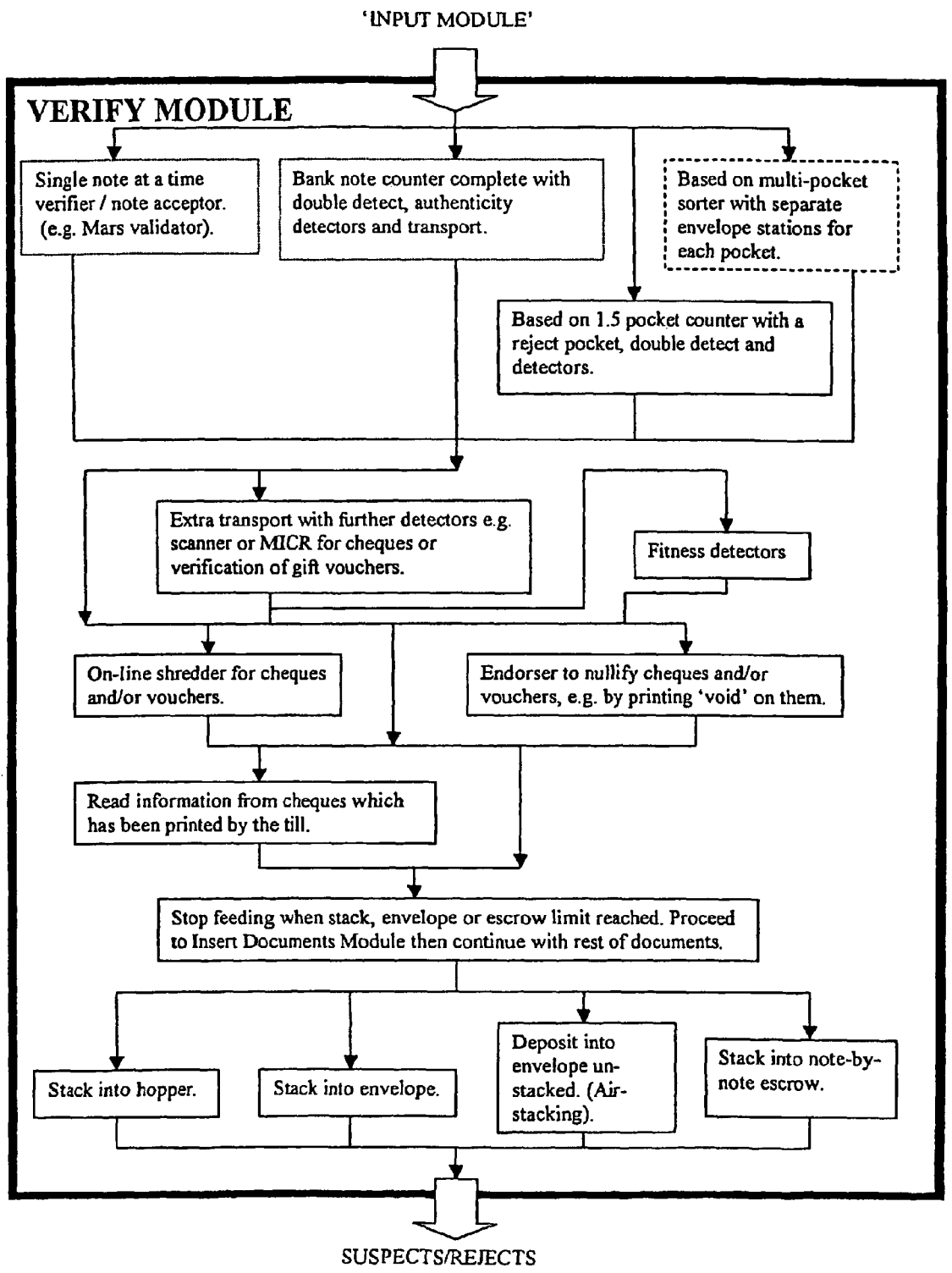
Figure 16:
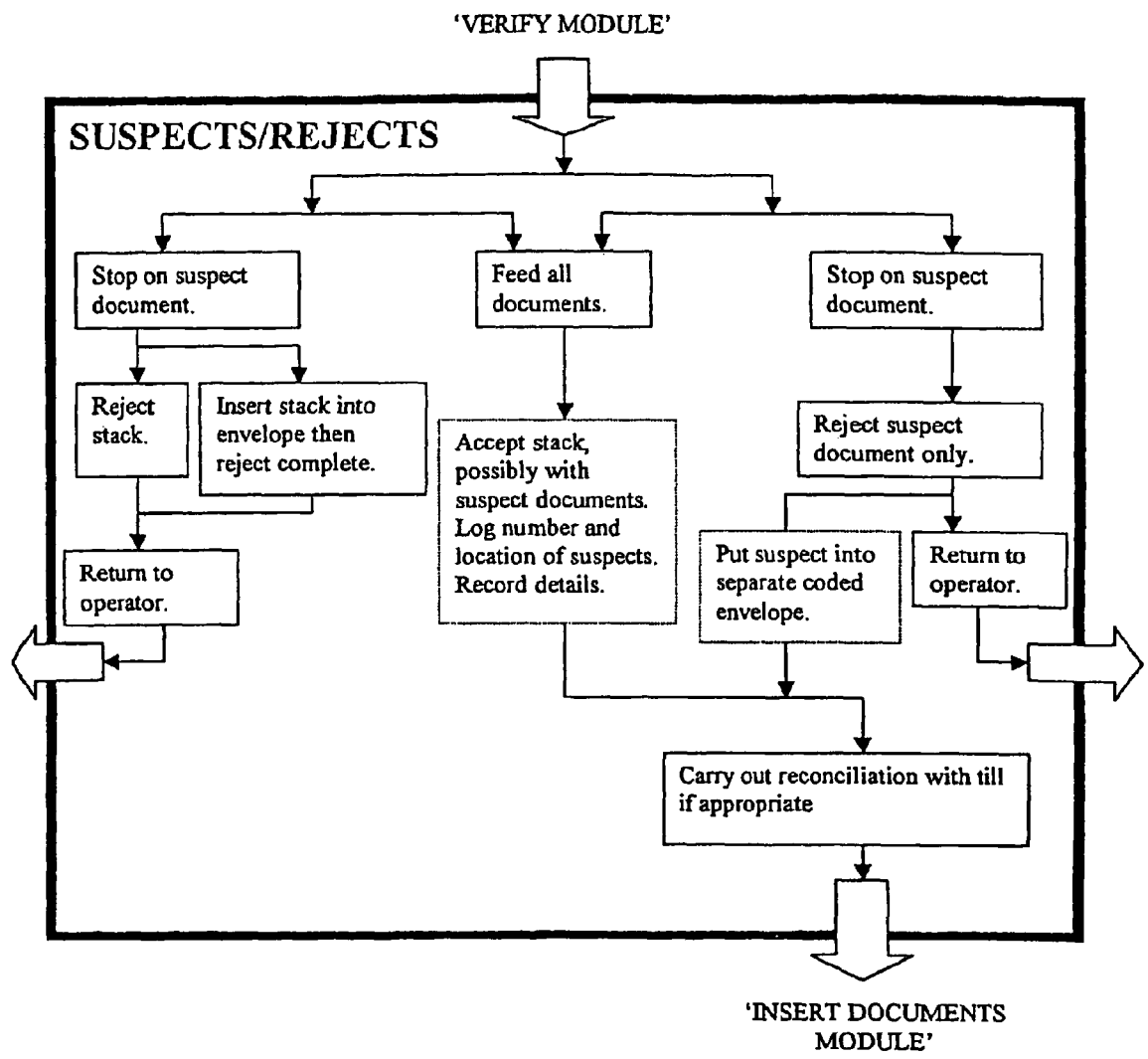
Figure 17:
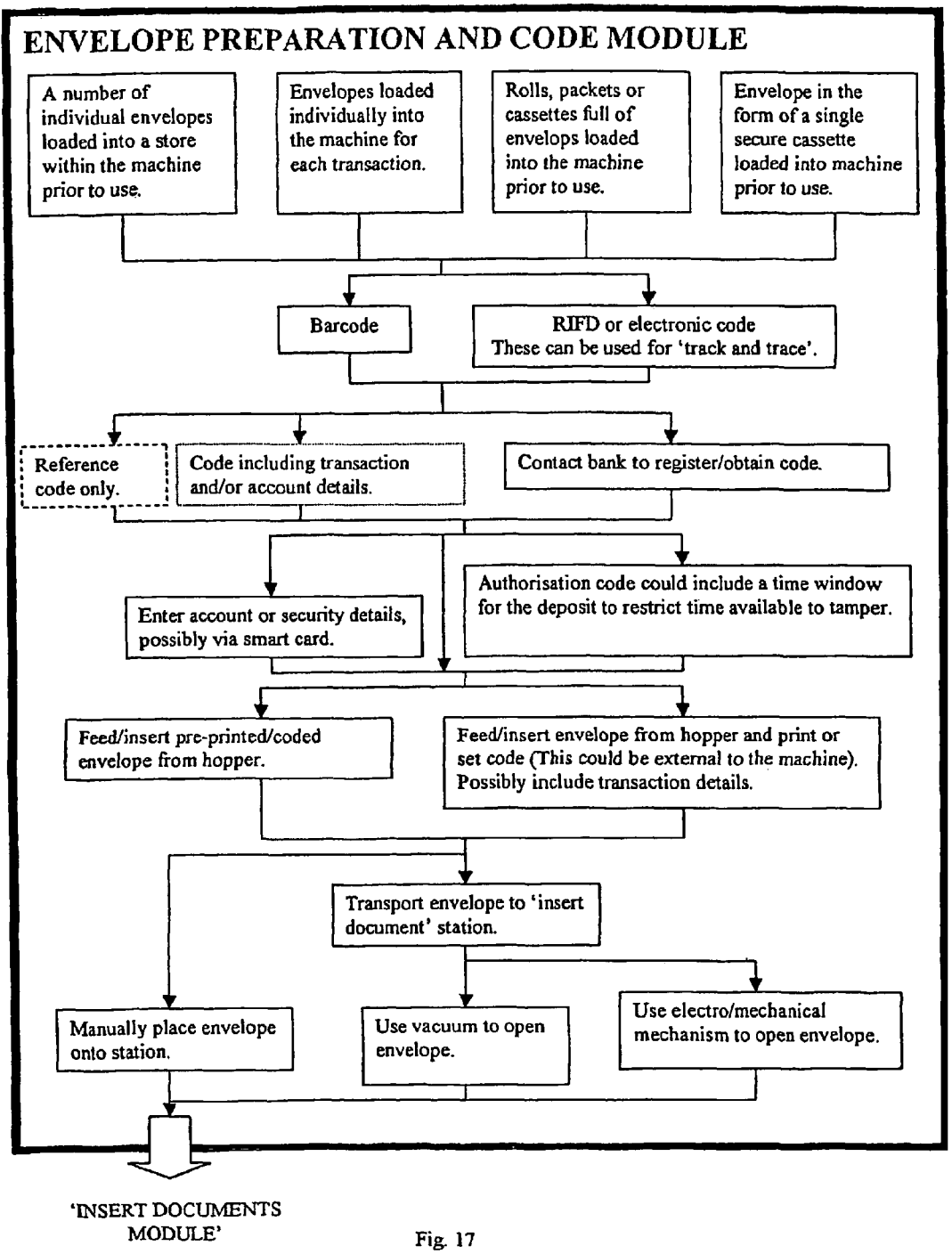
Figure 18:
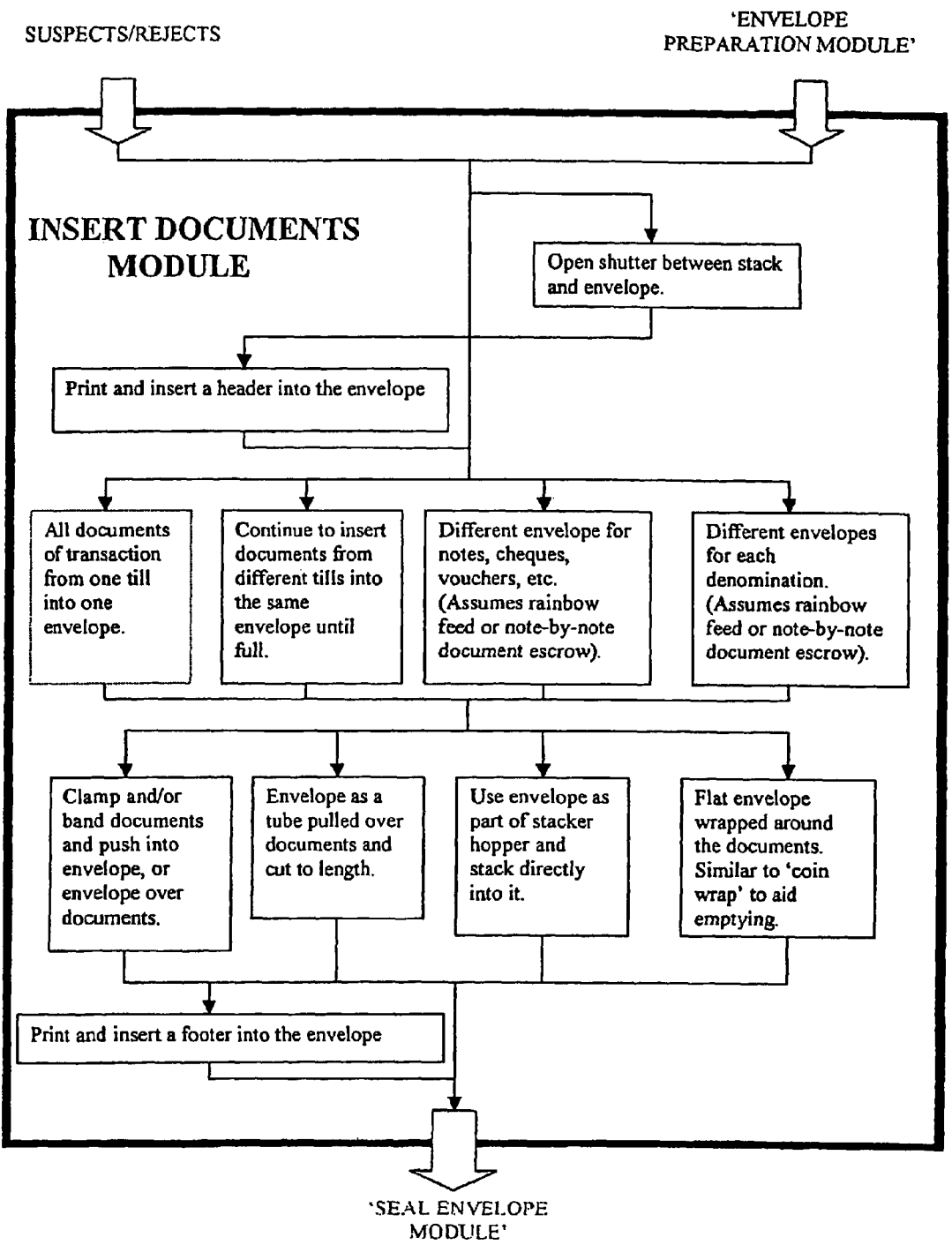
Figure 19:
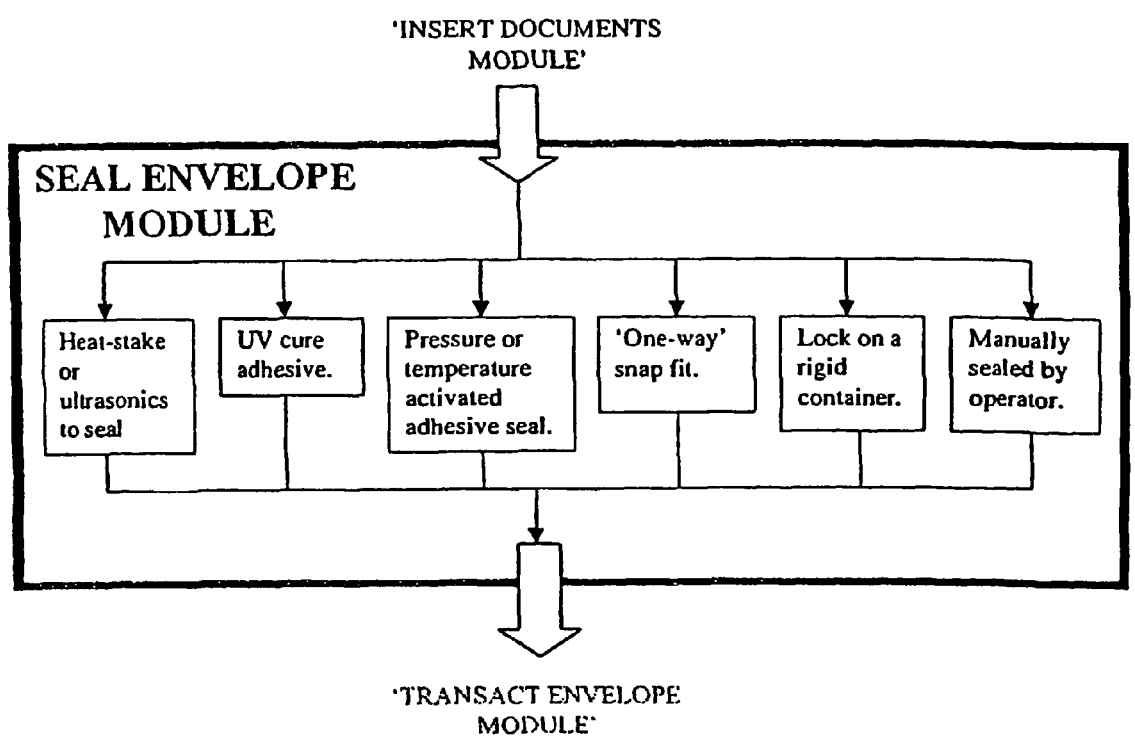
Figure 20:
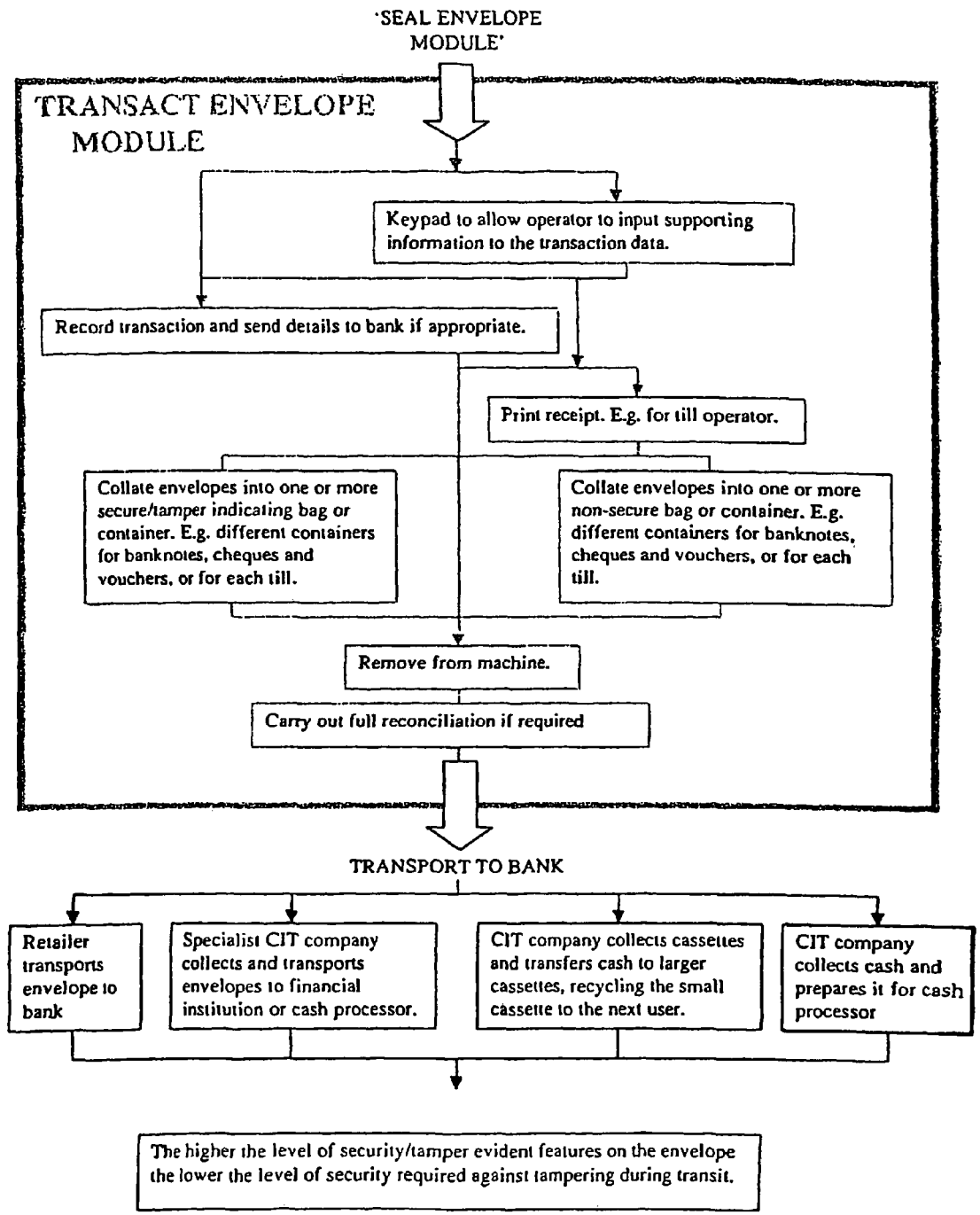

In order to be able to handle envelopes of the type shown in FIGS. 9A and 9B, a bar code and tamper evident reader system 316 is constructed as shown in FIG. 10. The system comprises two pairs of feed rollers 330,331 controlled by a motor 332 which in turn is controlled from a microprocessor 333. Upper and lower UV sources 334,335 controlled from the microprocessor 333 are provided downstream of the rollers 330, and sensors 336,337 are located downstream of the sources 334,335 to detect fluorescent light.

A pair of white light sources 338,339 are located downstream of the sensors 336,337 for the purpose of detecting a bar code 309, reflected light being incident on respective sensors 341,342 connected to the microprocessor 333.

When an envelope 130 is presented to the input (not shown) of the reader system 316, it is detected by a sensor (not shown) to which the microprocessor 333 responds by activating the rollers 330,331 to draw the envelope 8 into the system. The microprocessor 333 then activates the sources 334,335 which like the other sources and detectors extends across the full width of the envelope 130 so that the envelope is irradiated with UV radiation on both sides. Any fluorescent radiation will be received through suitable filters by the sensors 336, 337 and the intensity of this radiation together with wavelength information will be fed to the microprocessor 333.

The microprocessor 333 then compares the received wavelengths and possibly the locations on the envelope generating the received wavelengths with prestored information in a store 343. This prestored information may comprise wavelengths which would be detected if the envelope had been tampered with, optionally with this information being stored for each region of the envelope monitored by the sensors 336,337. If any radiation is received which suggests that the envelope has been tampered with (in the example described above this would correspond to green or yellow radiation) then the microprocessor 333 will determine that the envelope has been tampered with and cause the motor 332 to reverse so that the envelope is fed back out of the input. It will be appreciated that the structure of the envelope is such that tampering with any part of it will be detected.

If the tamper evident test is successful, the white light sources 338,339 are illuminated so that the bar code information can be sensed by one of the sensors 341,342 and be passed to the microprocessor 333. The microprocessor 333 then allows the envelope 130 to be fed onto a store (not shown) while transmitting information about the bar code to the remote host 4 so that the host can credit an account with the value of the items e.g. banknotes in the envelope without the need to open the envelope.

In simpler forms of the apparatus, only one side of the envelope could be inspected. If unsuccessful, the user would then need to insert the envelope in a different orientation to be checked again.

Also, under controlled conditions, the envelope could be manually scanned and in this case it is preferable to apply bar codes in multiple positions down each side of the envelope so that to achieve deposit the detector must see all the bar codes and hence have a reasonable view of the complete exterior of the envelope.

FIGS. 11 to 20 summarize in diagrammatic form the various embodiments described and indicate some further alternatives.

The invention claimed is:

1. A deposit apparatus for receiving a sealed, tamper evident container includes financial items of value, the container carrying a machine readable code related to the content of the container, the apparatus comprising a tamper detection system for determining if the container has been tampered with; a code reader for reading the code on the container; and a receptacle for storing accepted containers, wherein the tamper detection system includes a radiation source and detector adapted to monitor the luminescent response of a container to radiation from the source, and a processor responsive to the luminescent response of the container to determine if the container has been tampered with, and the container material exhibits a particular pattern of luminescence when untampered with and subjected to radiation, and the container material exhibits a different pattern of luminescence when tampered with and subjected to the radiation.

2. The apparatus according to claim 1, wherein the receptacle is secure, for example a safe.

3. The apparatus according to claim 1, further comprising a memory for storing details relating to the expected content of the container.

4. The apparatus according to claim 1, wherein the processor monitors radiation sensed by the detector to determine if all the received radiation relates to radiation expected from a non-tampered container.

5. The apparatus according to claim 1, further comprising a transmitter for transmitting the code to a host processor.

6. The apparatus according to claim 5, wherein the transmitter is adapted to transmit the code only if the tamper detection system indicates that the package has not been tampered with.

7. The apparatus according to claim 5, wherein the host processor is located remote from the rest of the deposit apparatus.

8. The apparatus according to claim 5, wherein the host processor is located on the premises of a financial institution, such as a bank.

9. The apparatus according to claim 5, further comprising an escrow store in which containers can be temporarily stored prior to being inspected by the tamper detection system.

10. The apparatus according to claim 1, further comprising a reject outlet to which containers are supplied if the tamper detection system determines that a container has been tampered with.

11. The apparatus according to claim 10, wherein the reject outlet is inaccessible to the container depositor.

* * * * *